(12) United States Patent
Chougle et al.

(10) Patent No.: US 8,863,260 B2
(45) Date of Patent: Oct. 14, 2014

(54) ENHANCING PASSWORD PROTECTION

(75) Inventors: Abdullah A. Chougle, Pune (IN); Vishal V. Chougule, Pune (IN); Priyanka P. Jain, Indore (IN)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/490,624

(22) Filed: Jun. 7, 2012

(65) Prior Publication Data

US 2013/0333007 A1   Dec. 12, 2013

(51) Int. Cl.
*G06F 7/04* (2006.01)

(52) U.S. Cl.
USPC ........ 726/7; 726/5; 726/26; 726/27; 713/172; 713/168; 713/194

(58) Field of Classification Search
USPC .............. 726/5, 7, 26, 27; 713/172, 168, 194
See application file for complete search history.

(56) References Cited

U.S. PATENT DOCUMENTS

| | | | |
|---|---|---|---|
| 6,950,949 B1 | 9/2005 | Gilchrist | |
| 2003/0037262 A1* | 2/2003 | Hillhouse | 713/202 |
| 2007/0250920 A1* | 10/2007 | Lindsay | 726/7 |
| 2008/0209223 A1* | 8/2008 | Nandy et al. | 713/185 |
| 2009/0158424 A1 | 6/2009 | Yang | |
| 2009/0284344 A1 | 11/2009 | Craymer et al. | |
| 2011/0047607 A1* | 2/2011 | Chen et al. | 726/7 |
| 2012/0323717 A1* | 12/2012 | Kirsch | 705/26.1 |
| 2013/0333010 A1* | 12/2013 | Chougle et al. | 726/7 |

OTHER PUBLICATIONS

Li Ma, Young-Mei Zhang et al., "A kind of hiberarchy status authentication mechanism in information grid", "Proceedings of the Eighth International Conference on Machine Learning and Cybernetics, Baoding, Jul. 12-15, 2009", pp. 1321-1327.*

"Form grabbing", http://en.wikipedia.org/wiki/Form_Grabber, printed from the Internet on May 7, 2012, 1 page.

"Zeus (Trojan horse)", http://en.wikipedia.org/wiki/Zeus_(trojan_horse), printed from the Internet on May 7, 2012, 5 pages.

"Banking Trojan Captures User's Screen in Video Clip", http://blog.hispasec.com/virustotal/8, printed from the Internet on May 7, 2012, 5 pages.

"Coventry Building Society Grid Card", http://blog.rlr-uk.com/2010/02/coventry-building-society-grid-card.html, Wednesday, Feb. 17, 2010, printed from the Internet on May 7, 2012, 2 pages.

(Continued)

*Primary Examiner* — Mohammad A Siddiqi
(74) *Attorney, Agent, or Firm* — Francis Lammes; Stephen J. Walder, Jr.; Jeffrey S. LaBaw

(57) ABSTRACT

A mechanism is provided for enhancing password protection. A combination password that comprises dynamic text interspersed within a static user password is received from a user. A determination is made as to whether the combination password is to be verified without the dynamic text. Responsive to identifying that the combination password is to be verified without the dynamic text, the dynamic text is filtered from the combination password based on an identified dynamic suggestion issued to the user prior to the combination password being received thereby forming a filtered password. The filtered password is then authenticated using information stored for the user. Responsive to validating the filtered password, access is granted by the user to a secured system.

14 Claims, 8 Drawing Sheets

(56) References Cited

OTHER PUBLICATIONS

"Entrust IdentityGuard 8.1 Deployment Guide", Entrust Securing Digital Identities & Information, Entrust, Document issue: 2.0, Date of Issue: Apr. 2007, 158 pages.

"Grid & eGrid Cards", http://www.entrust.com/strong-authentication/gridcard/index.htm, printed from the Internet on Feb. 1, 2012, 1 page.

"GridId", http://deepnetsecurity.com/tokens/hardware/gridid/, printed from the Internet on May 7, 2012, 1 page.

"Secure Passwords against Trojan Theft using CAPTCHA Keyboard", http://hansheng.yolasite.com/resources/SecurePasswordCaptcha.pdf, printed from the Internet on May 7, 2012, 4 pages.

"Security Now 298", http://wiki.twit.tv/wiki/Security_Now_298, printed from the Internet on May 7, 2012, 6 pages.

"Strong Authentication Methods", http://www.entrust.com/strong-authentication/authenticators.htm, printed from the Internet on May 7, 2012, 12 pages.

"What is a GRID Card?", http://www.tatrabanka.sk/cms/page/en/individual_clients/electronic_banking/dialog/grid_card.html, printed from the Internet May 7, 2012, 1 page.

Meyer, Roger, "Secure Authentication on the Internet", SANS Institute 2007, Apr. 4, 2007, 36 pages.

Pansa, Detchasit et al., "Web Security Improving by using Dynamic Password Authentication", 2011 International Conference on Network and Electronics Engineering, IPCSIT, vol. 11 (2011), pp. 32-36.

USPTO U.S. Appl. No. 13/774,191, 1 page.

* cited by examiner

ENHANCING PASSWORD PROTECTION

BACKGROUND

The present application relates generally to an improved data processing apparatus and method and more specifically to mechanisms for enhancing password protection.

A password is a secret word or string of characters that is used for authentication, to prove identity or gain access to a resource (example: an access code is a type of password). The use of passwords is known to be ancient. Sentries would challenge those wishing to enter an area or approaching it to supply a password or watchword. Sentries would only allow a person or group to pass if they knew the password. In modern times, user names and passwords are commonly used by people during a log in process that controls access to protected computer operating systems, mobile phones, cable TV decoders, automated teller machines (ATMs), etc. A typical computer user may require passwords for many purposes: logging in to computer accounts, retrieving e-mail from servers, accessing programs, databases, networks, web sites, and even reading the morning newspaper online.

Despite the name, there is no need for passwords to be actual words; indeed passwords which are not actual words may be harder to guess, a desirable property. Some passwords are formed from multiple words and may more accurately be called a passphrase. The term passcode is sometimes used when the secret information is purely numeric, such as the personal identification number (PIN) commonly used for ATM access. Passwords are generally short enough to be easily memorized and typed.

SUMMARY

In one illustrative embodiment, a method, in a data processing system, is provided for enhancing password protection. The illustrative embodiment receives a combination password from a user. In the illustrative embodiment the combination password comprises dynamic text interspersed within a static user password. The illustrative embodiment determines whether the combination password is to be verified without the dynamic text. Responsive to identifying that the combination password is to be verified without the dynamic text, the illustrative embodiment filters the dynamic text from the combination password based on an identified dynamic suggestion issued to the user prior to the combination password being received thereby forming a filtered password. The illustrative embodiment authenticates the filtered password using information stored for the user. Responsive to validating the filtered password, the illustrative embodiment grants access by the user to a secured system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments focus on improving today's prevalent methods of risk based authentication in high risk events. Specifically, protecting user's most important and sensitive information from attacker's point of view this is a user's password. That is, the present invention makes the password more difficult to sniff out, by making it semi-dynamic using dynamic suggestions dispatched via out-of-band mechanisms. Further, the present invention uses the notion of "something you know and/or something you have" to make the password more secure. This novel approach makes the "first factor" of authentication itself stronger rather than relying on multi-factor alternatives by making user's password hard to steal by converting traditional static passwords to "semi-dynamic" passwords.

Figure 1:
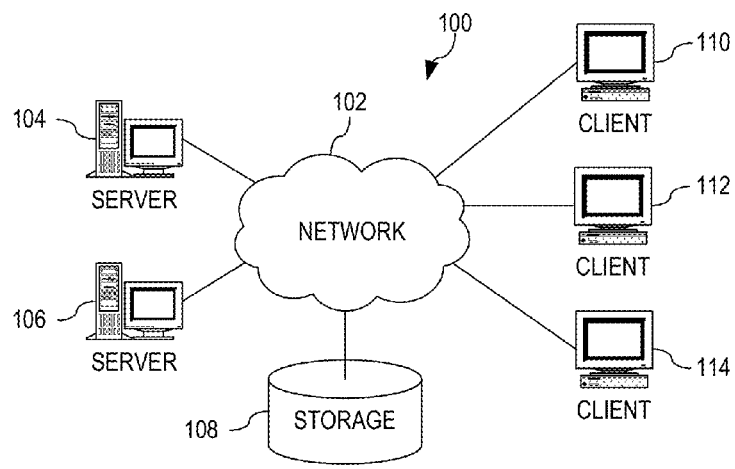
FIG. 1 is an example diagram of a distributed data processing system in which aspects of the illustrative embodiments may be implemented.
Figure 2:
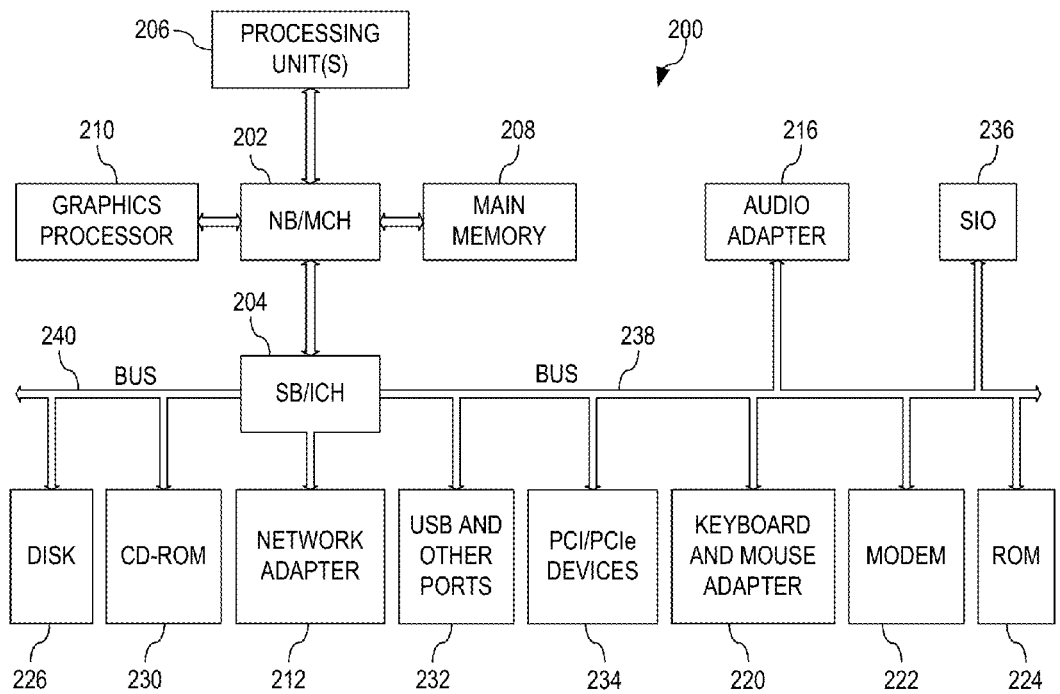
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, mobile devices, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Utilizing a data processing system, such as data processing system 200 of FIG. 2, the illustrative embodiments intermixes a static user password with dynamic suggestions to form a combination password along with making passwords semi-dynamic, with the help of notion of "something you know and something you have," such as the static user password and, for example, a grid card. In the illustrative embodiments, a user's login page differ from a traditional login page, in respect that, the user's login page only displays a field for entering the user's identification, at which the user will enter their user id.

An authentication server validates the user id and, in case of valid user id, the authentication server computes a "risk" of the event using, for example, risk based/adaptive authentication mechanisms. In the case of a "risky" event, the authentication server sends dynamic suggestions to the user's device through, for example, email, text message, CAPTCHA, or the like, with instructions on how to the user should enter dynamic suggestion. The dynamic suggestions may comprise providing position(s) where to enter dynamic text and the dynamic text to be entered at the position(s), or position(s) where to enter dynamic text and dynamic position(s) associated with a grid card where the user can locate the dynamic text to be entered. Once the user has entered the combination password, the authentication server verifies the combination password in accordance with the issued dynamic suggestions. If the authentication password successfully verifies the combination password, the authentication server grants the user access. In the case of a "low risky" event, the authentication server may send a standard suggestion to the user indicating that the user may enter the static user password in a normal fashion.

Figure 3:
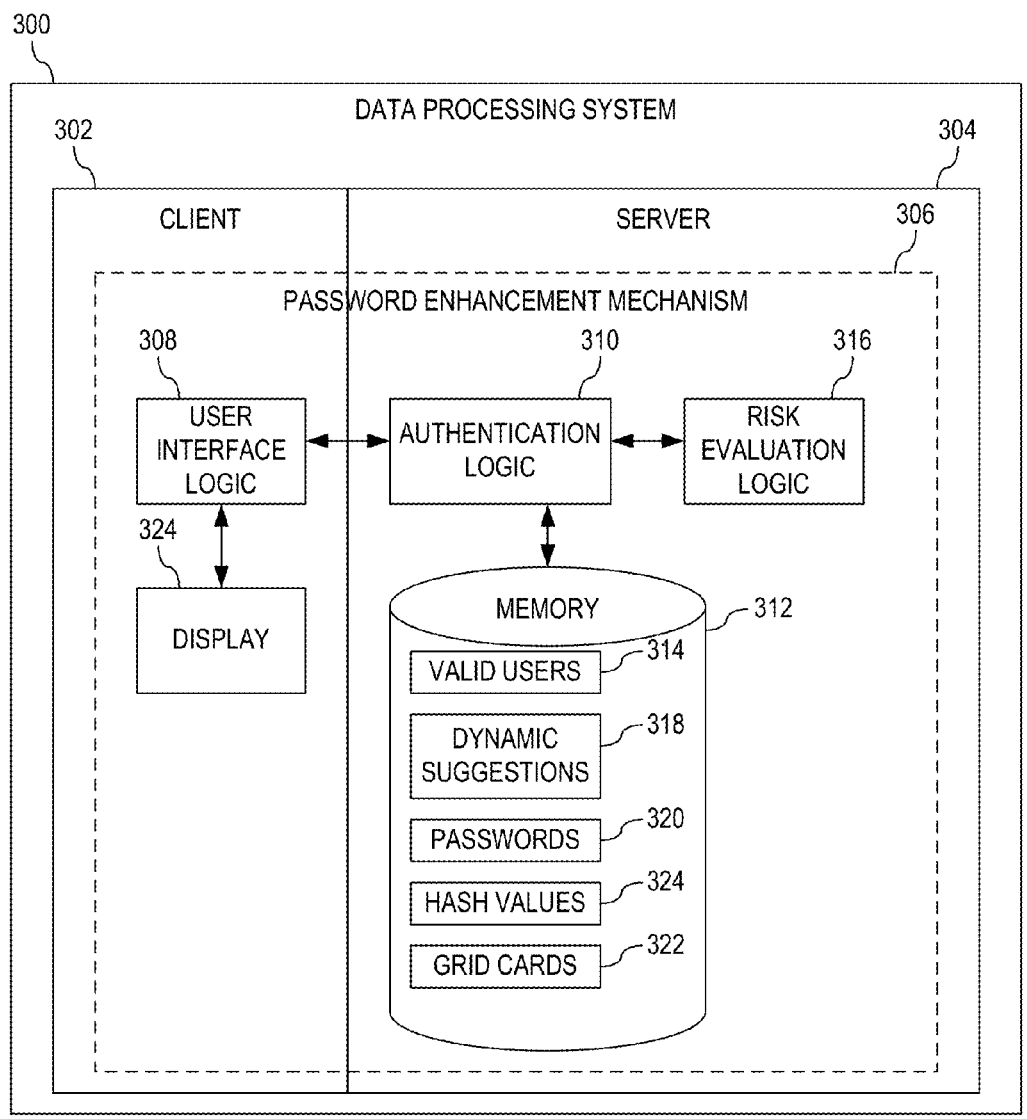
FIG. 3 depicts a password enhancement mechanism in accordance with an illustrative embodiment.

FIG. 3 depicts a password enhancement mechanism in accordance with an illustrative embodiment. Data processing system 300 comprises client 302 and authentication server 304, which comprises client side component and a server side component, respectively, of password enhancement mechanism 306. The client side component of password enhancement mechanism 306 comprises user interface logic 308 interfacing with display 324 which presents a login screen to a user when the user is attempting to login to a secured system. Upon the user entering a user id and providing an indication that the user id has been entered correctly, user interface logic 308 transmits the user id to authentication logic 310 in the server side component of password enhancement mechanism 306. Upon receiving the user id, authentication logic 310 verifies that the user id is a valid user id by comparing the user id to a data structure of valid user ids 314 residing in memory 312. Once the user id is validated, authentication logic 310 requests risk evaluation logic 316 provide a risk assessment based on various predetermined parameters and settings that are being used in a current time period. The various predetermined parameters and settings may comprise device fingerprinting, location fingerprinting, behavioral pattern, current network security setting, firewall assessments, the device being used is a public device, or the like.

Results of the risk evaluation by risk evaluation logic 316 may be in a simple form, such as "high" or "low", may be in the form of a rating from 1-10, where 1 is the lowest risk and 10 is the highest risk, or another type or representation that provides a clear indication to authentication logic 310 of a current risk level. Depending on the risk level, authentication logic 310 identifies a dynamic suggestion from a data structure of dynamic suggestions 318 in memory 312 to use for the identified risk level. The dynamic suggestions may comprise the intermixing of dynamic text values within the users known password at dynamic position(s), entering only initial or ending few characters of password, followed by information that "user and server knows" like entering the user's date of birth in a ddmmyy format, entering text mapped to a grid card, or the like. Authentication logic 310 then sends the identified dynamic suggestion to user interface logic 308 and then onto the user, that indicates no additional text is required in low risk situations or one or more additional dynamic text requirements are required as the risk level increases, for example, one in a medium-low risk situation, two in a medium risk situation, three or more in a high-risk situation, or the like. Authentication logic 310 may send the dynamic suggestions and user interface logic 308 may present the identified dynamic suggestions to the user through out-of-band mechanisms, such as email, text message, CAPTCHA, or the like, or any combination of these.

Figure 4A:
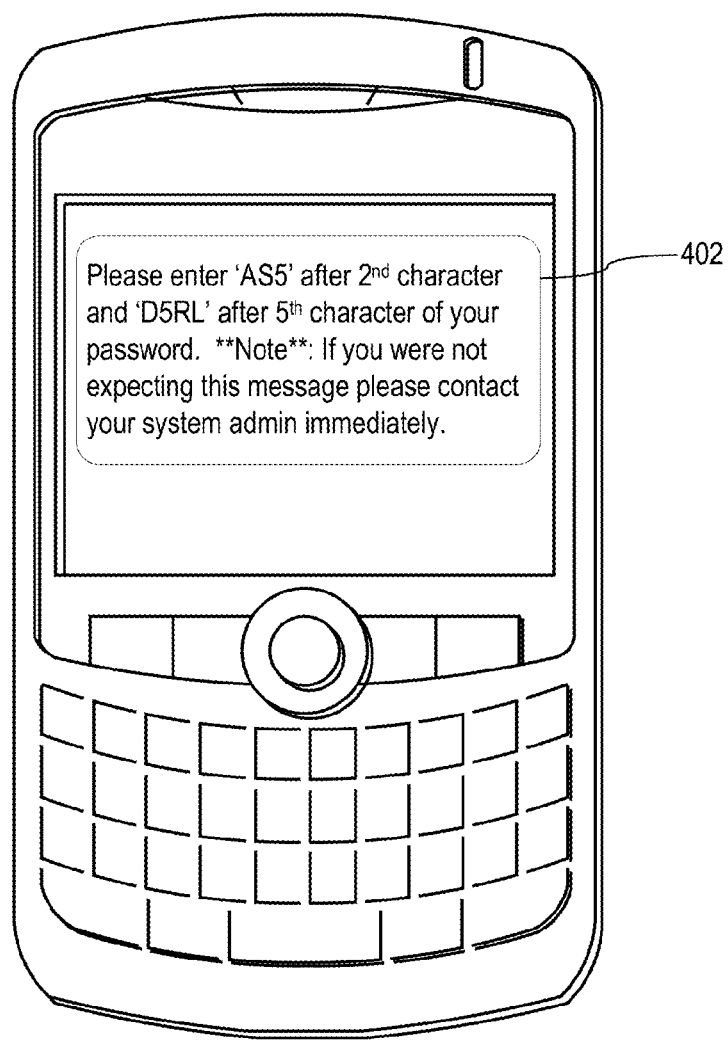
FIGS. 4A-4D provide examples of dynamic suggestions that may be provided to the user in accordance with the illustrative embodiments.
Figure 4B:
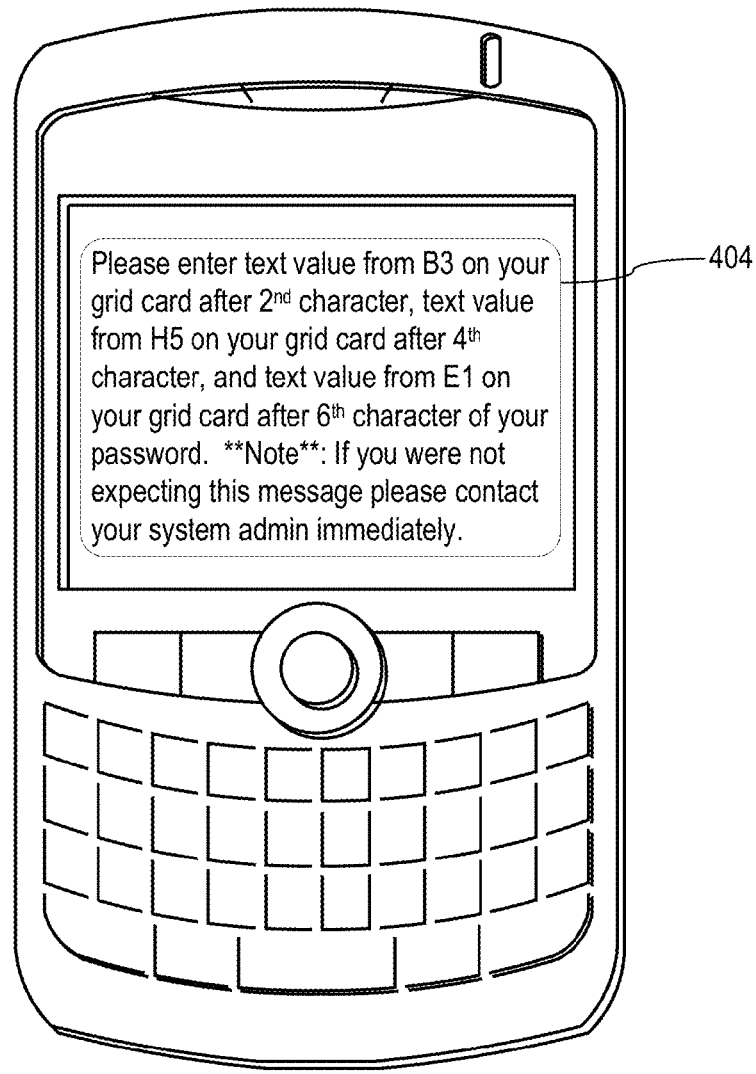
Figure 4C:
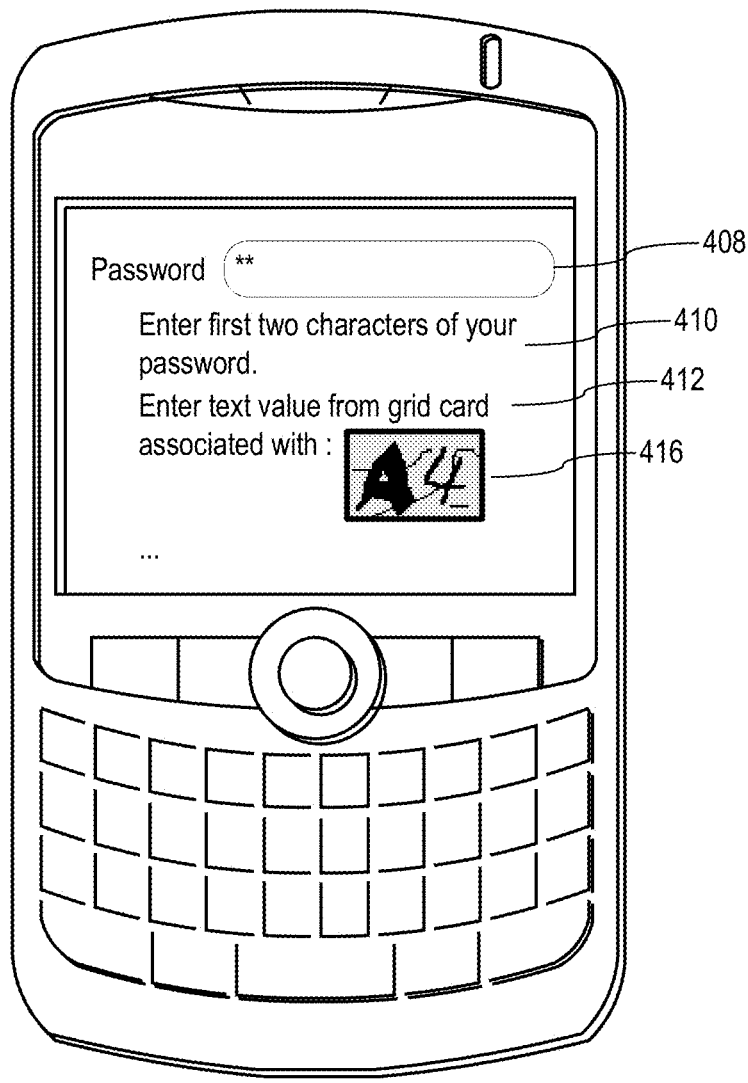
Figure 4D:
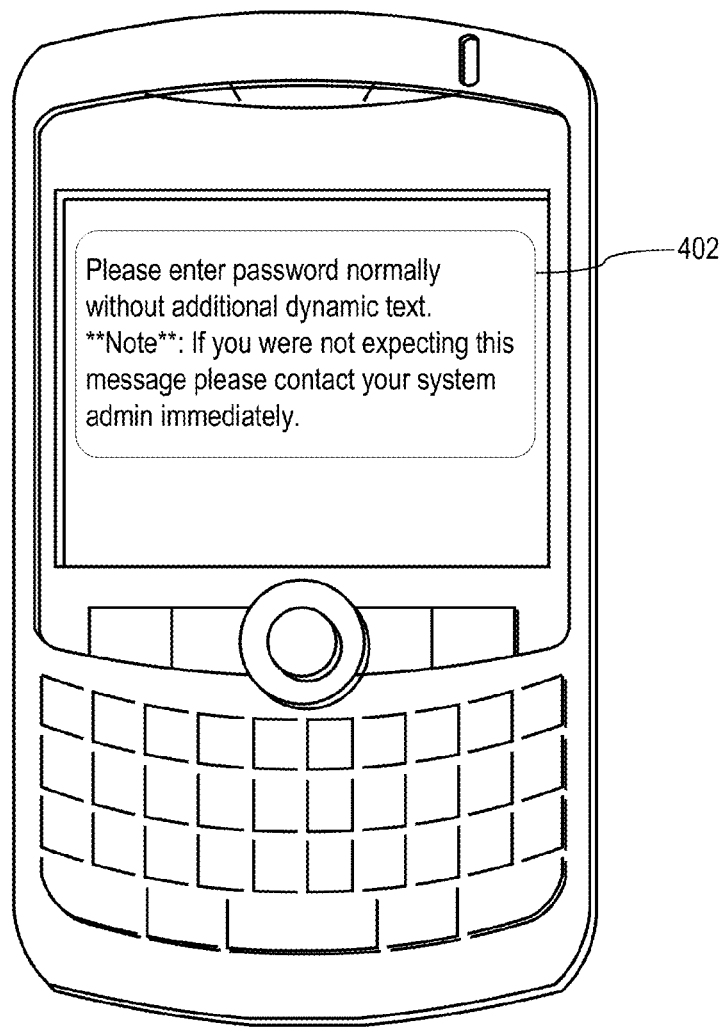

FIGS. 4A-4D provide examples of dynamic suggestions that may be provided to the user in accordance with the illustrative embodiments. FIG. 4A depicts text message 402 that instructs the user to enter the text value 'AS5' after a second character of the static user password as well as the text value 'D5RL' after a fifth character of the static user password. FIG. 4B depicts text message 404 that instructs the user to enter the text value at location B3 from grid card 406 after a second character, the text value at location H5 from grid card 406 after a fourth character of the static user password, and the text value at location E1 from grid card 406 after a sixth character of the static user password. FIG. 4C depicts a dynamic solution using CAPTCHA pop-up windows where, as the user types in the password into password field 408, a first instruction 410 instructs the user to enter the first two characters of the password. Then, a second instruction 412 instructs the user to next enter a text value from grid card 414 associated with a value shown in CAPTCHA window 416. Additional password and CAPTCHA pop-up instructions may follow that require the user to perform similar functions at different position(s) within the static user password. Finally, FIG. 4D depicts text message 402 that instructs the user to enter the static user password normally without additional dynamic text.

Returning to FIG. 3, once user interface logic has presented the dynamic suggestion to the user, the user enters the password with/without the dynamic text requirements of the dynamic suggestion. For example, if the dynamic suggestion is as depicted in FIG. 4A and the static user password is "cred1234," then the user would enter "crAS5ed1D5RL234". As another example, if the dynamic suggestion is as depicted in FIG. 4B and the static user password is "cred1234," then the user would enter "crETedAU125734". As still another example although not fully depicted in FIG. 4C, if the static user password is "KV4E" and the dynamic suggestion is to enter the first two letters of the password, then the user would enter "KV". Then the next instruction is to enter a text value form the grid card associated with the CAPTCHA value 'A4' that equates to "QK", thus the user would enter "QK". Although not depicted, the user would then be instructed to enter the next two letters from the password, which would be "4E" with a following instruction to enter a text value form the grid card associated with the CAPTCHA value 'D5' that equates to "LV", thus the user would enter "LV". Thus, the complete password would be "KVQK4ELV". In accordance with FIG. 4D, the user would enter in accordance with FIGS. 4A and 4B "cred1234" or in accordance with FIG. 4C "KV4E".

Once the user enters the password with/without the dynamic text requirements of the dynamic suggestion and submits an indication that the password has been entered in its entirety, user interface logic 308 sends the password back to authentication logic 310. Depending on implementation, authentication logic 310 may then filter out the dynamic text entered by the user based on the identified dynamic suggestion issued to the user thereby leaving only the password with which to authenticate the user against a corresponding stored password for that user in a data structure of passwords 320 in memory 312 or authenticate the static user password against a generated hash value of the static user password using a predefined algorithm, which is then compared to a corresponding stored hash value in a data structure of hash values 324 in memory 312. Additionally, authentication logic 310 may also verify the filtered dynamic text against the dynamic text issued to the user as another level of authentication. Alternatively, authentication logic 310 may construct a comparison password utilizing the password for the user from the data structure of passwords 320 in memory 312 and the identified dynamic suggestion from that data structure of dynamic suggestions 318 in memory 312 that was sent to the user. It should be noted that a grid card that the user uses and may be time period specific, such that a user is issued a new grid card at regular intervals and authentication logic 310 utilizes a copy of the grid card in a data structure of grid cards 322 in memory 312 for that particular user. In either scenario, authentication logic 310 will authenticate the user based on a password comparison if the filtered password provided by the user matches a password stored in memory 312 or if the password provided by the user matches a constructed password. If the authentication logic 310 does not verify the user, the user may be notified, and one or more additional attempts may be made to verify the user up to a predetermined number of attempts before authentication logic 310 issues an error, such as the user must retry after a predetermined time period, the user must call an administrator to have the password reset, or the like.

Thus, the illustrative embodiments enhance a static user password such that the password cannot be easily compromised. That is, by making a static user password semi-dynamic, the static user password is stronger than merely using the notion of "something you know, something you have". Since the user's original password will not be directly entered, but based on dynamic suggestions sent by the authentication server, the password is protected from malwares, such as keyloggers, form grabbers, screen/video capture threats, or the like. Since the illustrative embodiments focus on password protection utilizing risk evaluation, original passwords will not be leaked to attacker even from malware infected public place computing devices. This is specially of significance when a same device will be used by attacker at later time, since the device has already been tagged as a "risk computing device system" by the authentication server. Unlike the way virtual keyboard is usually implemented, this protection will be mandatory for end-users.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5A:
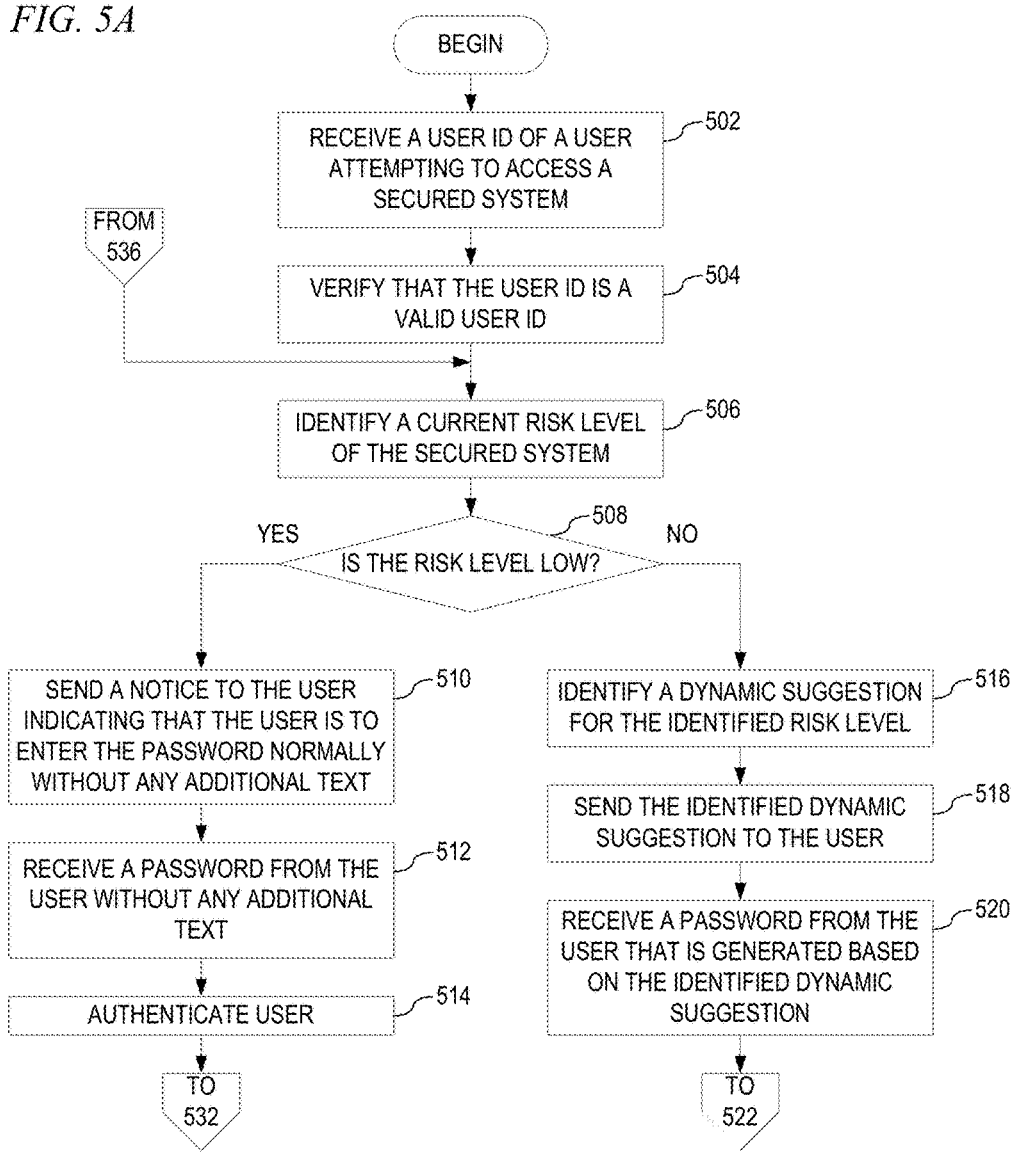
FIGS. 5A and 5B depict a flow diagram of the operation performed by a password enhancement mechanism in accordance with an illustrative embodiment.
Figure 5B:
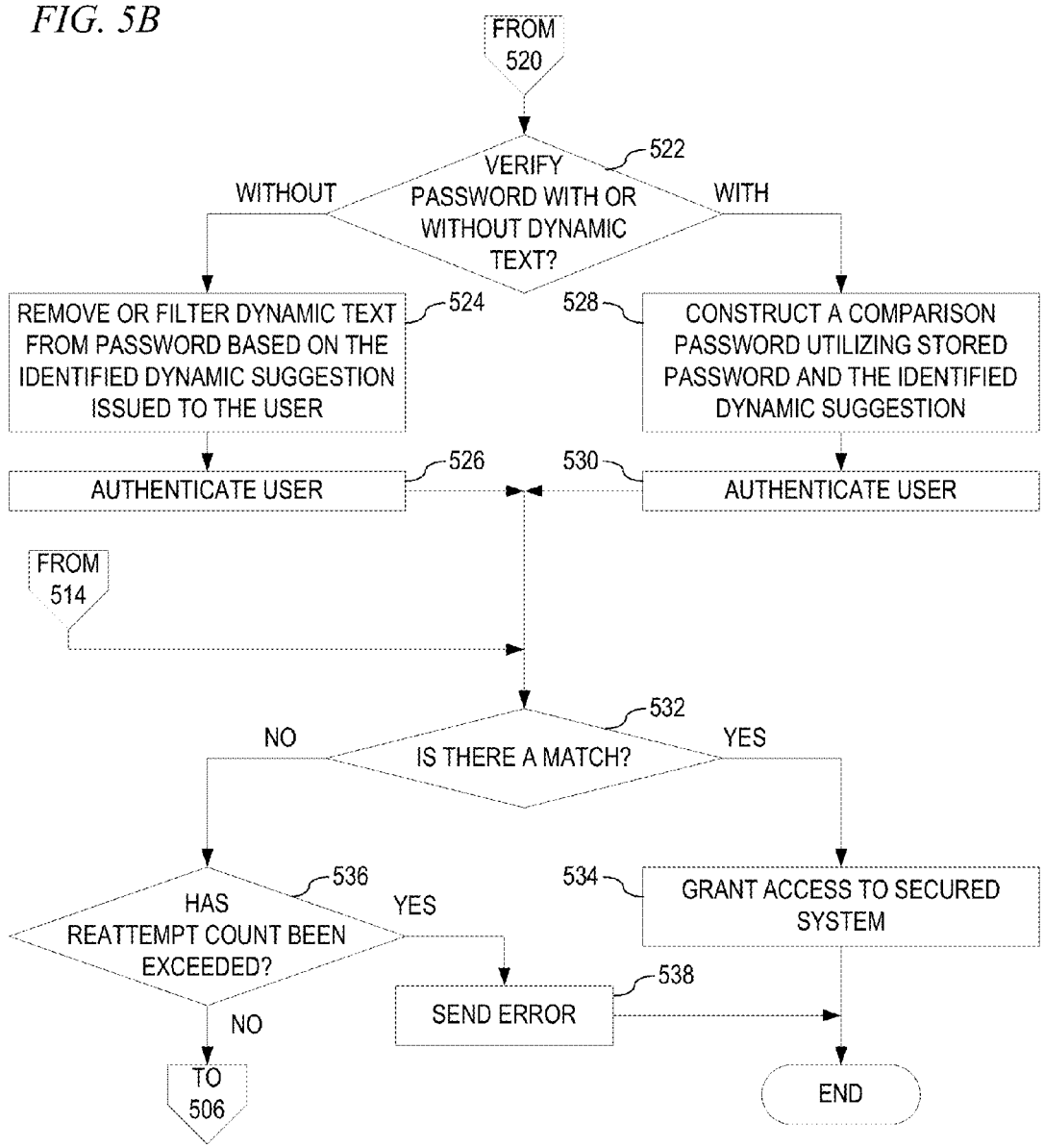

FIGS. 5A and 5B depict a flow diagram of the operation performed by a password enhancement mechanism in accordance with an illustrative embodiment. As the operation begins, the password enhancement mechanism, executed by a processor, receives a user id of a user attempting to access a secured system (step 502). The password enhancement mechanism verifies that the user id is a valid user id by comparing the user id to a data structure of valid user ids residing in memory (step 504). Once the user id is validated, the password enhancement mechanism identifies a current risk level of the secured system (step 506) based on various predetermined parameters and settings that are being used in a current time period. The various predetermined parameters and settings may comprise device fingerprinting, location fingerprinting, behavioral pattern, current network security setting, firewall assessments, the device being used is a public device, or the like.

At step 508, if the password enhancement mechanism identifies the current risk level of the secured system to be low, then the password enhancement mechanism sends a notice to the user indicating that the user is to enter the password normally without any additional text (step 510). The password enhancement mechanism then receives a password from the user (step 512). The password enhancement mechanism authenticates the user based on a comparison of the received password to a corresponding password stored for that user in a data structure of passwords in memory or authenticate the static user password against a generated hash value of the static user password using a predefined algorithm, which is then compared to a corresponding stored hash value stored for that user in a data structure of hash values in memory (step 514), with the process proceeding to step 532 thereafter. However, if at step 508 the password enhancement mechanism identifies the current risk level of the secured system greater than a low risk, the password enhancement mechanism identifies a dynamic suggestion from a data structure of dynamic suggestions in memory to use for the identified risk level (step 516). The password enhancement mechanism sends the identified dynamic suggestion to the user (step 518) through email, text message, CAPTCHA, or the like. The password enhancement mechanism then receives a password from the user that is generated based on the identified dynamic suggestion (step 520). The password enhancement mechanism then determines whether the password is to be verified with or without the dynamic text inserted into the password (step 522).

If at step 522 the password is to be verified without the dynamic text inserted into the password, the password enhancement mechanism removes or filters the dynamic text based on the identified dynamic suggestion issued to the user (step 524). The password enhancement mechanism authenticates the user based on a comparison of the filtered password to a corresponding password stored for that user in a data structure of passwords in memory or authenticates the static user password against a generated hash value of the static user password using a predefined algorithm, which is then compared to a corresponding stored hash value stored for that user in a data structure of hash values in memory (step 526). Optionally, at step 526, the password enhancement mechanism may also verify the filtered dynamic text against the dynamic text issued to the user as another level of authentication.

If at step 522 the password is to be verified with the dynamic text inserted into the password, the password enhancement mechanism constructs a comparison password utilizing the password for the user from a data structure of passwords in memory and the identified dynamic suggestion from the data structure of dynamic suggestions in memory that was sent to the user (step 528). The password enhancement mechanism then authenticates the user based on a comparison of the password received from the user and the constructed password or authenticate the static user password against a generated hash value of the static user password using a predefined algorithm, which is then compared to a corresponding stored hash value stored for that user in a data structure of hash values in memory (step 530).

From steps 514, 526, and 530, the password enhancement mechanism determines whether there is a password match (step 532). If at step 532 the password enhancement mechanism determines that there is a match, then the password enhancement mechanism grants access to the secured system by the user (step 534), with the operation ending thereafter. If at step 532 the password enhancement mechanism determines that there is no match, then the password enhancement mechanism determines whether a reattempt count at verifying the user has been exceeded (step 536). If at step 536 the reattempt count has not been exceeded, the operation returns to step 506. If at step 536 the reattempt count has been exceeded, then the password enhancement mechanism sends an error (step 538), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
    receive a combination password from a user, the combination password comprising dynamic text interspersed within a static user password, the combination password generated by presenting a dynamic suggestion to the user, the dynamic suggestion to the user instructing the user to enter a first text value at a first identified location from a grid card either after or before a first identified character position of the static user password, and the first text value identified by a first column indicator and a first row indicator;
    determine whether the combination password is to be verified without the dynamic text;
    responsive to identifying that the combination password is to be verified without the dynamic text, filter the dynamic text from the combination password based on the dynamic suggestion issued to the user prior to the combination password being received thereby forming a filtered password;
    authenticate the filtered password using information stored for the user; and
    responsive to validating the filtered password, grant access by the user to a secured system.

2. The computer program product of claim 1, wherein filtering the dynamic text from the combination password based on an identified dynamic suggestion issued to the user prior to the combination password being received further forms filtered dynamic text and wherein the computer readable program further causes the computing device to:
    compare the filtered dynamic text against an identified dynamic suggestion issued to the user.

3. The computer program product of claim 1, wherein the computer readable program further causes the computing device to:
    responsive to identifying that the combination password is to be verified with the dynamic text, construct a comparison password utilizing the stored password and the identified dynamic suggestion;
    compare the comparison password to the combination password received from the user;
    determine whether the comparison password matches the combination password; and
    responsive to identifying a match of the comparison password to the combination password, grant access by the user to the secured system.

4. The computer program product of claim 1, wherein the computer readable program further causes the computing device to:
    receive a user id of the user attempting to access the secured system;
    verify that the user is a valid user id by comparing the user id to a data structure of valid user ids;
    responsive to the user being a valid user, identify a current risk level of the secured system in a current time period;
    responsive to the current risk level being greater than a lowest risk level, identify the dynamic suggestion from a data structure of dynamic suggestions to use for the current risk level; and
    send the identified dynamic suggestion to the user in order for the user to generate the combination password.

5. The computer program product of claim 1,
    wherein the dynamic suggestion further instructs the user to enter at least one subsequent text value at a subsequent identified location from the grid card either after or before at least one subsequent identified character position of the static user password and wherein the at least one subsequent text value is identified by an associated subsequent column indicator and a subsequent row indicator.

6. The computer program product of claim 1, wherein the combination password is generated by the computer readable program further causing the computing device to:
    present a set of instructions associated with the dynamic suggestion to the user, wherein the set of instructions instructs the user to enter a first portion of the static user password followed by a first value identified in a first CAPTCHA pop-up presented to the user and wherein the set of instructions further instructs the user to enter at least one subsequent portion of the static user password followed by at least one subsequent text value identified in a subsequent CAPTCHA pop-up presented to the user.

7. The computer program product of claim 1, wherein the combination password is generated by the computer readable program further causing the computing device to:
    present a set of instructions associated with the dynamic suggestion to the user, wherein the set of instructions instructs the user to enter a first portion of the static user password followed by a first text value at a first identified location identified in a first CAPTCHA pop-up presented to the user from the grid card, wherein the first text value is identified by a first column indicator and a first row indicator, wherein the set of instructions further instructs the user to enter at least one subsequent portion of the static user password followed by at least one subsequent text value at a subsequent identified location identified in a subsequent CAPTCHA pop-up presented to the user from the grid card, and wherein the at least one subsequent text value is identified by an associated subsequent column indicator and a subsequent row indicator.

8. An apparatus, comprising:
    a processor; and
    a memory coupled to the processor, wherein the memory comprises instructions which, when executed by the processor, cause the processor to:
    receive a combination password from a user, the combination password comprising dynamic text interspersed within a static user password, the combination password generated by presenting a dynamic suggestion to the user, the dynamic suggestion instructing the user to enter a first text value at a first identified location from a grid card either after or before a first identified character position of the static user password, and the first text value identified by a first column indicator and a first row indicator;

determine whether the combination password is to be verified without the dynamic text;

responsive to identifying that the combination password is to be verified without the dynamic text, filter the dynamic text from the combination password based on the dynamic suggestion issued to the user prior to the combination password being received thereby forming a filtered password;

authenticate the filtered password using information stored for the user; and responsive to validating the filtered password, grant access by the user to a secured system.

9. The apparatus of claim 8, wherein filtering the dynamic text from the combination password based on an identified dynamic suggestion issued to the user prior to the combination password being received further forms filtered dynamic text and wherein the instructions further cause the processor to:

compare the filtered dynamic text against an identified dynamic suggestion issued to the user.

10. The apparatus of claim 8, wherein the instructions further cause the processor to:

responsive to identifying that the combination password is to be verified with the dynamic text, construct a comparison password utilizing the stored password and the identified dynamic suggestion;

compare the comparison password to the combination password received from the user;

determine whether the comparison password matches the combination password; and responsive to identifying a match of the comparison password to the combination password, grant access by the user to the secured system.

11. The apparatus of claim 8, wherein the instructions further causes the processor to:

receive a user id of the user attempting to access the secured system;

verify that the user is a valid user id by comparing the user id to a data structure of valid user ids;

responsive to the user being a valid user, identify a current risk level of the secured system in a current time period;

responsive to the current risk level being greater than a lowest risk level, identify the dynamic suggestion from a data structure of dynamic suggestions to use for the current risk level; and send the identified dynamic suggestion to the user in order for the user to generate the combination password.

12. The apparatus of claim 8, wherein the dynamic suggestion further instructs the user to enter at least one subsequent text value at a subsequent identified location from the grid card either after or before at least one subsequent identified character position of the static user password and wherein the at least one subsequent text value is identified by an associated subsequent column indicator and a subsequent row indicator.

13. The apparatus of claim 8, wherein the combination password is generated by the instructions further causing the processor to:

present a set of instructions associated with the dynamic suggestion to the user, wherein the set of instructions instructs the user to enter a first portion of the static user password followed by a first value identified in a first CAPTCHA pop-up presented to the user and wherein the set of instructions further instructs the user to enter at least one subsequent portion of the static user password followed by at least one subsequent text value identified in a subsequent CAPTCHA pop-up presented to the user.

14. The apparatus of claim 8, wherein the combination password is generated by the instructions further causing the processor to:

present a set of instructions associated with the dynamic suggestion to the user, wherein the set of instructions instructs the user to enter a first portion of the static user password followed by a first text value at a first identified location identified in a first CAPTCHA pop-up presented to the user from the grid card, wherein the first text value is identified by a first column indicator and a first row indicator, wherein the set of instructions further instructs the user to enter at least one subsequent portion of the static user password followed by at least one subsequent text value at a subsequent identified location identified in a subsequent CAPTCHA pop-up presented to the user from the grid card, and wherein the at least one subsequent text value is identified by an associated subsequent column indicator and a subsequent row indicator.

* * * * *